Nov. 14, 1967     V. C. CLINE     3,351,969
FLEXIBLE SCRAPER
Filed May 19, 1965
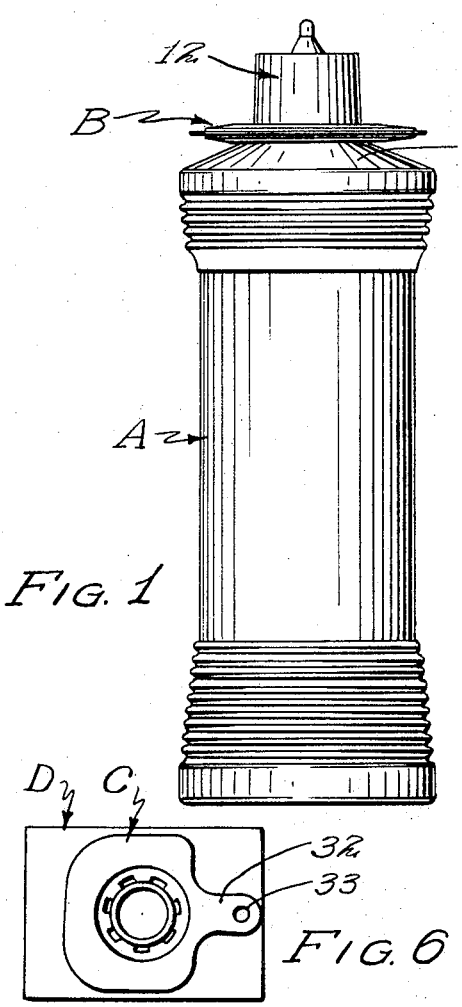
FIG. 1
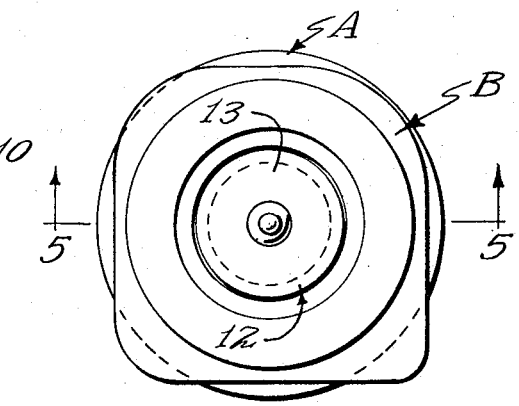
FIG. 2
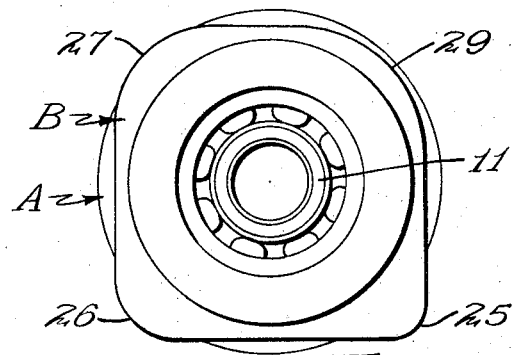
FIG. 3
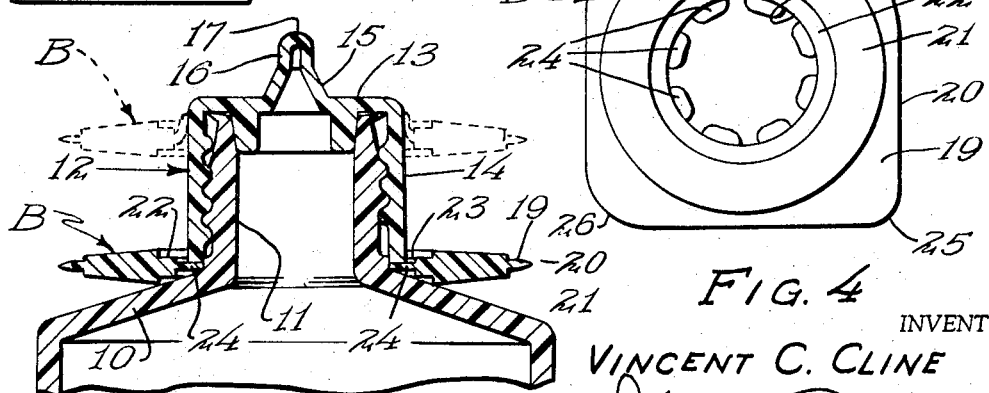
FIG. 6
FIG. 5
FIG. 4
INVENTOR
VINCENT C. CLINE
BY [signature]
ATTORNEY

United States Patent Office 3,351,969
Patented Nov. 14, 1967

3,351,969
FLEXIBLE SCRAPER
Vincent C. Cline, 98 S. Wheeler St.,
St. Paul, Minn. 55105
Filed May 19, 1965, Ser. No. 457,053
4 Claims. (Cl. 15—245)

ABSTRACT OF THE DISCLOSURE

The invention involves a scraper blade of resilient material having angularly spaced straight thin scraping edges and curved corners of varying curvatures. A circular ring-shaped thickened reinforcing area is provided having a circular aperture therethrough adapted to fit the neck of a receptacle. The portion of the body encircling the aperture is thin, and preferably is divided into inwardly extending resilient tabs to frictionally engage the receptacle neck or cap.

---

This invention relates to an improvement in dish and pan scraper and deals with a simple and effective device which may be used in conjunction with a bottle of detergent or cleaning material so that it is readily available for use in cleaning dishes and pans.

Numerous types of scrapers have been produced for use in cleaning dishes and pans designed to be used in scraping off material which has become firmly attached to the dish or pan. These scrapers are often times used in conjunction with a liquid or powdered detergent or other cleaning material. In most instances, the dish or pan is covered with liquid detergent or a powdered detergent mixed with water, and the scraper blade is used to detach the stubbornly attached material on the surface of the article. It is an object of the present invention to provide a scraper blade which may be used much in the same manner as previous scrapers, but which is provided with an aperture extending therethrough designed to accommodate the neck or the cap of a bottle which usually contains the cleaning material. As a result, the scraper is at all times readily available when the cleaning material is used.

A feature of the preferred form of construction lies in the provision of a scraper blade formed of plastic, rubber or other suitable material which is flexible and resilient and not injurious to the surface of the dish or pan being cleaned. The scraper blade is preferably generally rectangular in form and dimensioned so that the side edges of the blade do not project beyond the periphery of the bottle to which it is attached. As a result, the bottles of cleaning material may be shipped or stored in side by side relation and will not require any more packing space than is normally necessary to contain the bottles of cleaning material.

A further feature of the present invention resides in the provision of a scraper blade which may be produced at low cost, and which, if desired, may be used in conjunction with a bottle of the cleaning product without materially adding to the cost of the product. In other words, the scraper blade may be produced at a low enough cost so that it may be added to the product as an incentive to the sale of the product.

A feature of the present invention lies in the provision of a scraper blade of the type described which may be provided with a central aperture of a diameter sufficient to fit over the cap of a bottle of product, and which includes inwardly extending resilient angularly spaced projections which may extend beneath the cap of the bottle so that the blade is somewhat difficult to remove without removing the cap of the bottle. At the same time, these teeth are sufficiently flexible so that the scraper blade may be forced over the cap, the teeth or tabs flexing to permit the scraper blade to be frictionally engaged upon the cap in position where it may be easily removed for use. As a result, the scraper blade is always readily available for use whenever the bottle is used to apply the cleaning material to the surface to be cleaned.

A further feature of the present invention resides in the provision of a scraper blade which is generally square in outline, and in which the corners of the blade are rounded at the varying radii. In other words, one corner of the blade may be rounded to provide a curvature of large radius, and adjacent corner may be rounded at a somewhat lesser radius, the third corner may be rounded at a still shorter radius, and the fourth corner may be rounded at an even smaller radius. With this arrangement, the scraper blade is capable of fitting into the juncture between the bottom and the sidewall of pans of various shapes.

These and other objects and novel features of the present invention will be more clearly and fully set forth in the following specification and claims.

In the drawings forming a part of the specification;

FIGURE 1 is an elevational view of a bottle-like container of cleaning material showing the scraper blade in position for shipping.

FIGURE 2 is a top-plan view of the structure shown in FIGURE 1.

FIGURE 3 is a top-plan view similar to FIGURE 1 but with the bottle cap removed.

FIGURE 4 is a plan view of the scraper blade removed from the bottle.

FIGURE 5 is a sectional view through the upper portion of the bottle and scraper blade, the position of the section being indicated by the line 5—5 of FIGURE 2.

FIGURE 6 is a modified form of structure.

In the following description, the container on which the scraper blade is detachably supported, is described as a bottle. Popular brands of liquid detergent are currently being sold in plastic bottles with removable caps. In some instances, the caps are provided with dispensing tips which are originally closed, but which may be punctured or snipped off to permit the dispensing of the fluid from the bottle without removing the cap, so that the liquid contents may be sprayed under pressure by compressing the walls of the plastic bottle. It is intended that the term "bottle" be considered in a sense broad enough to cover cans or other similar containers having a removable cap.

In the particular arrangement illustrated, the container A comprises a hollow plastic receptacle having a tapered upper end 10 which terminates in an externally threaded generally cylindrical neck 11. Obviously, the lower end of the receptacle is closed. A cap 12 is threaded upon the neck 11 and includes a top closure plate 13 and a depending skirt portion 14 which is internally threaded. A conical hollow axial projection 15 is provided at the center of the top closure plate 13, and the conical projection 15 is provided with a cylindrical extension 16 having a closed upper end 17. This closed upper end may be perforated or may be snipped off so that the contents of the container A may be dispensed without removal of the cap 12. As will be understood, the specific form of the container A is not a portion of the present invention, as the scraper may be applied to any necked container preferably having a screw cap.

The scraper blade B is shown in the drawings in its preferred form. The peripheral portion of the blade B is a relatively thin flat blade portion which is sufficiently stiff to act as a scraper edge to be used for removing material adhered to a pan or dish, and yet sufficiently resilient to flex rather than to chip or break. As is indicated in FIGURE 5 of the drawings, the peripheral margin 16 of the peripheral area 15 is tapered to a thin edge. The scraper blade B comprises a body of plastic, rubber, or other suitable material which will not injure the surface of the pans or dishes. A plastic or rubber material is employed which is sufficiently rigid to serve as a scraper in removing food and other material which becomes attached to the surface to be cleaned. At the same time, the material is preferably sufficiently flexible so that it is not brittle and will not crack when in use.

In the preferred form illustrated, the top and bottom surfaces of the blade are similarly shaped and accordingly only one surface is illustrated. Inwardly of the thin marginal edge portion substantially flat marginal edge portion 19, the surfaces are provided with ring-shaped thickened reinforcing areas 21 which serve to strengthen the relatively thin edge portion 19. The edge portion 19 is tapered in thickness at its marginal edge 20 to provide an effective scraper edge. Inwardly of the circular ring-shaped portions 21 is provided a ring-shaped portion 22 of reduced thickness. The inner edge 23 of the reduced thickness ring 22 defines a circular opening through the blade.

As is perhaps best illustrated in FIGURE 4 of the drawings, a series of angularly spaced inwardly projecting tabs or teeth 24 extend into the opening. These tabs 24 are thin relative to the major portion of the blade, and are individually flexible. As indicated in full line in FIGURE 5 of the drawings, these tabs 24 are designed to encircle the neck 11 of the bottle A beneath the depending skirt portion 14 of the cap 12. Thus, the scraper blade is usually applied to the neck of the bottle before the cap 12 is applied thereto. When in this position, the scraper blade is difficult to remove without removing the cap, making the blade relatively pilfer proof. When in this position, the tabs 24 are engaged between the lower edge of the cap skirt 14 and the tapered upper end 10 of the bottle. However, the tabs 24 are sufficiently flexible so that the blade may be pressed down over the upper portion of the cap after the blade has once been removed from the bottle neck. The blade B is indicated in dotted outline when engaged on the neck where it may be retained in convenient relation to the bottle.

The purpose of this arrangement is to permit the blade to remain attached to the bottle when it is not in use without requiring the removal of the cap, as the cap is not usually removed during the dispensing of the product.

While the scraper blade B has been described as generally square in outline, the corners of the blade are shown as being rounded with varying radii of curvature. As a specific example, the corner 25 may be rounded at a radius of curvature of one-quarter of an inch, while an adjoining corner 26 may be rounded at a radius of curvature of three-eighths of an inch. A third corner 27 may be rounded with a radius of curvature of five-eighths of an inch, while the remaining corner 27 may be rounded at a radius of curvature of seven-eighths of an inch. The purpose of this arrangement is to provide a scraper blade having corners designed to fit the curvature of the interior of a dish or pan. Most shallow pans and similar utensils having a bottom panel and an upstanding peripheral wall are provided with a fillet or rounded surface adjoining the wall and the bottom panel of the utensil so as to simplify the cleaning operation. The various corners of the scraper blade are designed to approximately fit these curved surfaces in order to assist in dislodging material clinging to the utensil in this area.

As will be noted from an examination of FIGURES 1, 2, and 3 of the drawings, the body of the scraper blade is dimensioned to lie within the outlines of the periphery of the bottle A in areas spaced 90 degrees apart. As a result, the bottle A bearing the scraper blade B will fit within the same square cell as the bottle itself. If the bottles are shipped in a shipping container including an interior filler which divides the case into rectangular cells, the scraper blade will not require an increase in the size of the cells. Similarly, if the bottle is contained with any rectangular carton, the same size carton may be used as would be used for the bottle alone. It is true that the corners 25 and 26 of the blade B project beyond the periphery of the bottle, but these corners would extend into the corners of the carton itself.

FIGURE 6 illustrates a modified form of construction C designed for use when the container carton D is rectangular in form. The scraper C has a short handle 32 projecting from a side thereof and the handle is apertured as indicated at 33 so that it may be hung up.

In accordance with the Patent Statutes, the principles of construction and operation of this improvement in Dish and Pan Scraper have been described, and while an endeavor has been made to set forth the best embodiment thereof, it should be understood that changes may be made within the scope of the following claims without departing from the spirit of the invention.

I claim:
1. A scraper blade for use in combination with a hollow receptacle having a projecting neck and a cap removably supported on said neck, said blade comprising:
   a generally flat body of resilient material having a thin marginal edge portion having a plurality of angularly spaced straight scraping edges.
   a circular ring-shaped thickened reinforcing area inwardly of said marginal edge portion,
   said body having a circular aperture therethrough inwardly of said reinforcing area and adapted to encircle the neck of the receptacle, and a thin, flexible, inwardly extending portion on said body between said aperture and said circular reinforcing area.

2. A scraper blade adapted for use in combination with a receptacle having a neck and a cap detachably supported thereon, the blade including:
   a generally flat body of resilient material of generally square outline,
   said body including a relatively thin peripheral portion having rounded corners,
   a circular ring-shaped thickened reinforcing area inwardly of said marginal edge portion,
   a reduced thickness ring-shaped area inwardly of said reinforcing area which is of less thickness than said reinforcing area and of greater thickness than said marginal edge portion, said reduced thickness area defining an aperture adapted to accommodate said receptacle neck, and
   a series of angularly spaced tabs extending inwardly into said aperture from said reduced thickness area,
   said tabs being substantially on the plane of, and of similar thickness to, said marginal edge portion of said body.

3. A scraper blade comprising:
   a generally flat body of resilient material having a thin marginal edge portion and a relatively thick area inwardly of said marginal edge portion,
   said body being generally square in outline, the four corners of said body being rounded along a radius of curvature, the radius of curvature of each corner being different from the radius of curvature of the other corners,
   and a series of angularly spaced inwardly extending thin resilient tabs extending into said aperture.

4. A scraper blade adapted for use in combination with a receptacle having a neck and a cap removably secured on said neck, the blade including:
   a generally flat body of resilient material having a tapered marginal edge shaped to define a plurality of angularly spaced substantially straight scraping edges, said body having an aperture extending therethrough of a size to accommodate the neck of the receptacle extending therethrough, and a series of angularly spaced resilient integral tabs extending into said opening from the peripheral wall of the aperture and adapted to frictionally accommodate the receptacle cap.

References Cited

UNITED STATES PATENTS

| 1,388,282 | 8/1921 | Meredith | 15—245 |
| 2,380,855 | 7/1945 | Lower | 15—236 |
| 2,828,500 | 4/1958 | Peacock | 15—236 |
| 2,964,773 | 12/1960 | Pence | 15—245 |

CHARLES A. WILLMUTH, *Primary Examiner.*

E. L. ROBERTS, JR., *Assistant Examiner.*